United States Patent

[11] 3,587,774

[72] Inventors John Bemrose, deceased,
Elsie Hildegard Bemrose, Administratrix;
Lauren G. Kilmer, Tulsa, Okla.
[21] Appl. No. 755,465
[22] Filed Aug. 26, 1968
[45] Patented June 28, 1971
[73] Assignee said Kilmer assignor to Atlantic Richfield Company, New York, N.Y.

[54] SEISMIC SHEAR WAVE IMPULSE GENERATOR
12 Claims, 5 Drawing Figs.
[52] U.S. Cl. .................................... 181/0.5
[51] Int. Cl. ...................................... G01v 1/14
[50] Field of Search .......................... 181/0.5
(C); 340/15.5 (SW)

[56] References Cited
UNITED STATES PATENTS
2,760,591 8/1956 White et al. .................. 181/0.5

Primary Examiner—Rodney D. Bennett, Jr.
Assistant Examiner—Daniel C. Kaufman
Attorney—McLean, Morton and Boustead ABSTRACT: A seismic shear wave generator comprising a closed chamber having two horizontally displaced members resiliently fastened together to permit horizontal movement therebetween. A combustible gas is ignited within the chamber and the horizontal movement of one of the members is transferred to the ground to cause a seismic shear wave. To generate a seismic torsional shear wave, three or more generators are connected together in a ring and ignited simultaneously.

INVENTORS.
JOHN BEMROSE, deceased.
by ELSIE HILDEGARD BEMROSE,
administratrix.
& LAUREN G. KILMER

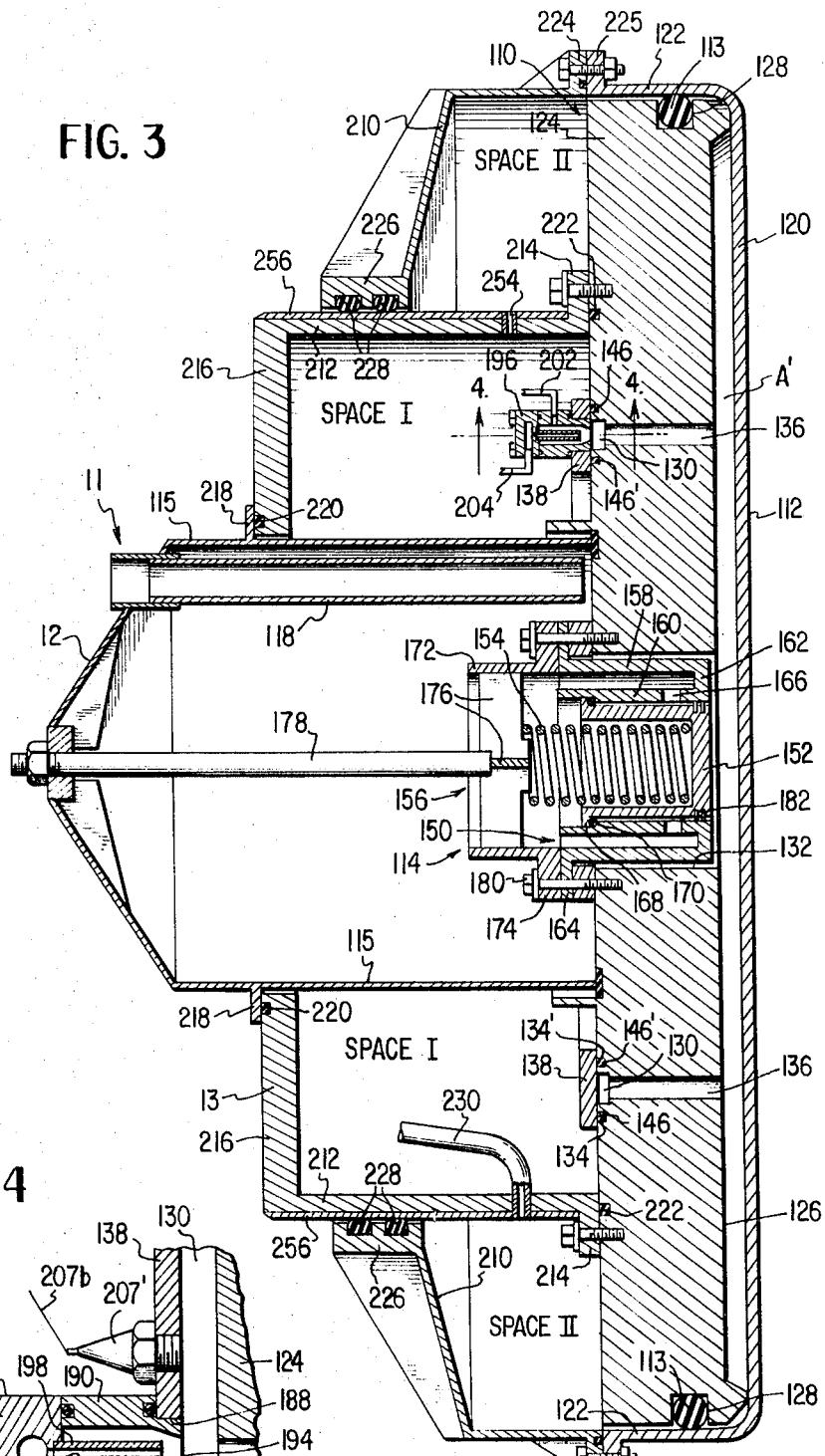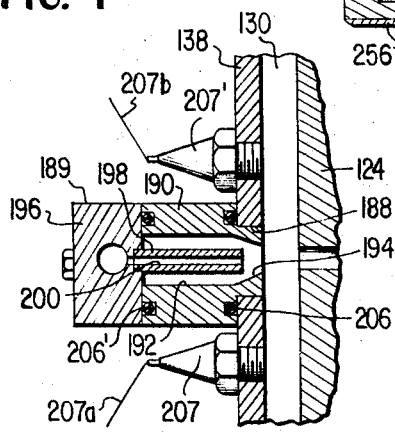

SEISMIC SHEAR WAVE IMPULSE GENERATOR

The present invention relates to transducers and in particular to a device for inducing impulsive seismic shear waves into the ground.

In general there are two types of wave signals which propagate through the earth as the result of a physical disturbance at the surface and which are capable of being reflected and/or refracted from subterranean interfaces. Such reflection or refraction makes the waves useful for seismographic surveying purposes. While many waves are generated from surface disturbances, the two most general types of waves consist of pressure waves and shear waves. Pressure waves are sometimes referred to as compressional or longitudinal waves because in such waves in the earth the particle motion is in the direction of the wave propagation. Shear waves result from particle motion generally at right angles to the direction of the wave propagation.

Shear waves can be further categorized into vertical, horizontal and torsional shear waves. When the particle motion is rectilinear and is oriented in a direction normal to the incidence plane, which is defined as a plane passing through the surface point origin of the wave and the surface point of detection of the wave and containing the normal to the interface causing the wave to be reflected, then the wave is defined as a horizontal shear wave. On the other hand, when the particle motion is oriented to lie wholly within the incidence plane, the wave is defined as a vertical shear wave. If, however, the earth particles have a rotary motion about an axis extending in the direction of propagation, the wave is defined as a torsional shear wave.

The present invention is an apparatus for generating these three types of shear waves. This apparatus includes means for generating impulsive seismic waves by means of confined gas explosions, and means for causing the generated impulsive seismic waves to impart horizontal shear waves into the ground surface. A further aspect of the present invention is apparatus for generating torsional shear waves comprising a plurality of the horizontal shear wave generation apparatuses coupled together and operated to generate torsional shear waves in which the direction of shear is tangential to a circular ground pattern whose dimensions are small in comparison with the wavelength of the propagation.

These and other aspects and advantages of the present invention are apparent in the following detailed description and claims, particularly when read in conjunction with the accompanying drawings in which like parts bear like reference numerals. In the drawings:

FIG. 3 is a vertical sectional view of a gas exploder suited for use in the present invention;

FIG. 4 is a fragmentary view taken along line 4—4 of FIG. 3; and

Figure 1:
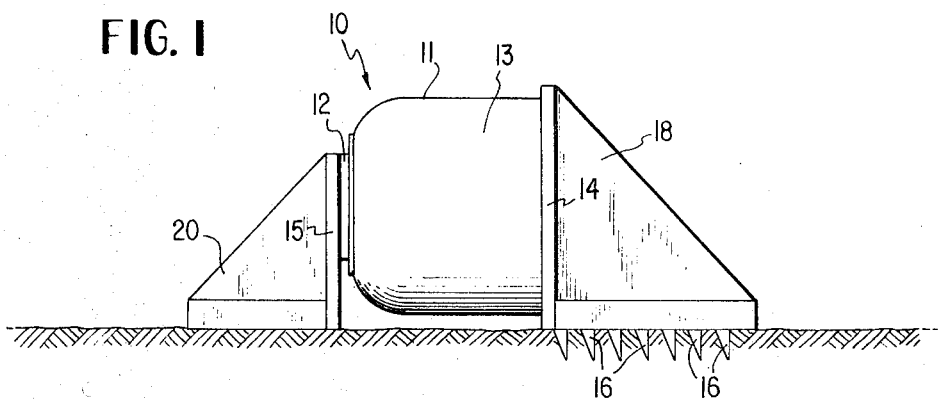
FIG. 1 is an elevational view of an embodiment of the present invention suited for generation of horizontal and vertical shear waves.
Figure 2:
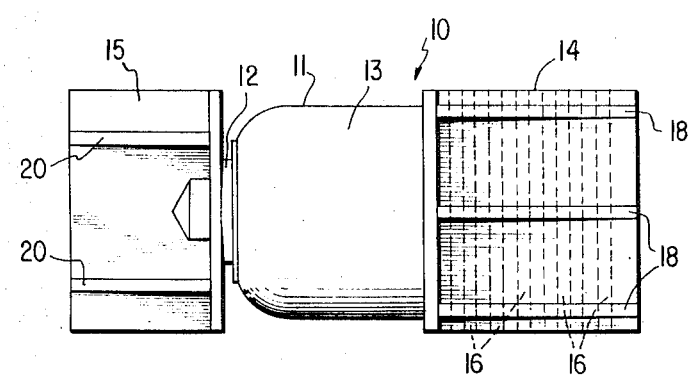
FIG. 2 is a plan view of the same embodiment of the present invention.

Seismic shear wave generator 10, depicted in FIGS. 1 and 2, includes an exploder unit 11 having a first member 12 supported at its first end by a cleated support plate 14 and supported at its second end by a smooth support plate 15. Cleats 16 attached to plate 14 penetrate into the ground to a depth determined by the weight of generator 10, the length of cleats 16 and the texture of the ground. Preferably plate 14 includes triangular support members 18 which rigidly brace plate 14. Plate 15 has no cleats on it, but instead has a smooth bottom surface resting upon the ground. To insure its rigidity, plate 14 also can include triangular support members 20. Support plates 14 and 15 hold generator 10 so that exploder unit 11 is not resting on the ground.

One apparatus suitable for use as exploder unit 11 is disclosed in copending U.S. Pat. application Ser. No. 613,792 filed Feb. 6, 1967, by Lauren G. Kilmer, now U.S. Pat. No. 3,401,771, issued Sept. 17, 1968. As depicted in FIG. 3, that apparatus basically includes a high mass member 110, a low mass member 112 a sealing ring 113, a valve 114 and an exhaust stack 115. Member 110 includes an annular, thick-steel plate 124 which has an outside diameter slightly smaller than the inside diameter of the flange 122 on member 112 and which is further provided with a depressed portion 126 in the side thereof adjacent member 112 as well as a groove 128 in the outer circumference thereof which contains sealing ring 113. The depressed portion 126 of plate 124 cooperates with rigid plate 120 of member 112 to form a chamber A' of the exploder. Plate 124 also has an annular groove 130 in its outer surface, between its outer rim and a central opening 132. Two smaller annular grooves 134 and 134' can be arranged, if desired, in plate 124 on opposite sides of groove 130 for O-rings 146 and 146', respectively, which seal groove 130. Groove 130 is connected to the chamber A' by two small, openings 136 disposed at substantially 180° relative to each other about central opening 132. Plate 124 carries a coaxially positioned, generally annular upper ring 138 which is attached to the outer side of plate 124 and covers groove 130 to form therewith an annular passage.

Valve 114 includes a valve body 150, a piston or valve element 152, a helical spring 154 and a spring retainer cage 156. Generally, valve body 150 includes a pair of coaxial cylindrical walls 158 and 160, which are spaced from each other, are closed together at their one end by means of an interconnecting annular wall 162 and are open at their other end. The outer wall 158 of valve body 150 and its outer end is provided with an exteriorly extending annular flange 164 and itself has a diameter just less than that of opening 132 such that valve body 150 can be positioned in opening 132 with flange 164 overlying the outer side of plate 124. Inner wall 160 has a machined inside surface which is countersunk at its outer end and which is provided with a series of apertures 166 adjacent its one end providing communication between the annular space between walls 158 and 160 and the central opening of valve body 150 lying inside wall 160. Piston 152 which is a machined casting sized to fit snugly but slidingly within cylindrical wall 160 has a flange 168 at its outer end received in the counter bore in the outer end of the interior of wall 160 to limit inward movement of piston 152 at a position in which the inner, closed end seals openings 166 in wall 160. An O-ring 170 cushions flange 168 at the counter bore surface. Piston rings 182 seal the piston 152 at its inner end.

Spring cage 156 includes a short steel cylinder 172 which has a pair of intersection steel cross plates 176 in its outer interior portion forming a spider to which is secured a cylindrical rod element 178. The cylinder portion 172 of spring cage 156 is positioned adjacent valve body 150 with flange 174 overlying flange 164, and spring cage 156 and valve body 150 are retained in such position by a series of cap bolts 180 received in apertures in flanges 164 and 174 which register with correspondingly disposed tapped bores arranged about opening 132 in plate 124 such that helical spring 154 is retained snugly under compression between the innerside of spider 176 and the outerside of the closed bottom of piston 152. The spacing of the flights of spring 154 in this position and the length of piston 152 in relation to the location of spider 176 is such that when piston 152 is displaced outwardly to the maximum compression of spring 154, apertures 166 in sidewall 160 are completely exposed to connect the chamber A' with the annular space between walls 158 and 160 of valve body 150 and hence with the exterior of the exploder through spring cage 156 and exhaust pipe 118. Pipe 118 can be connected through muffler 115 to provide low-pass characteristics desirably having an upper cutoff frequency on the order of about 5 cycles per second.

The gas charging system, shown in detail in FIG. 4, basically includes a mixing valve 189 interconnected to groove 130. The mixing valve comprises a member 190 inserted into aperture 188 in ring 138. Member 190 has a central passage 192 and a tapered conical opening 194 which faces groove 130.

An outer valve member 196 carries a tube 198 which is inserted into passage 192 and opening 194 so that the spacing of the passage through opening 192 is controlled by the location of tube 198. A passage 200 extends through tube 198 and member 196. Separate connections 202 and 204, preferably valved, leading to storage cylinders (not shown) respectively for propylene, or other suitable combustible gas, and oxygen are connected, respectively, to passages 192 and 200. Two O-rings 206 and 206' seal member 190 to ring 138 and member 196, respectively. The ignition system includes two spark plugs 207 and 207' (FIG. 4) arranged in apertures in ring 138 on either side of the mixing valve to extend through ring 138 and communicate with groove 130. Exteriorly the spark plugs thus mounted are electrically connected via lines 207a and 207b to a suitable electrical supply (not shown). It is also apparent that other types of gas manifolds, ignition systems, and valves can be used, if desired.

An air cushion formed between outwardly extending members 210 and 212 resiliently fastens low mass member 112 to high mass member 110. Member 212 is bolted to plate 124 at flange 214 and includes an outer flange 216 which engages flange 218 on muffler 115. Flange 216 is sealed at flange 218 by O-ring 220 and flange 214 is sealed at plate 124 by O-ring 222 to form between member 212 and muffler 115 an air space I. Member 210 is bolted at flange 224 to the flange 225 of member 112. Member 210 extends outwardly and centrally toward member 212 to slidedly engage member 212. Member 210 engages member 212 at an enlarged portion 226 and is sealed thereat by O-ring 228 to form an air space II. Member 212 can be sheathed in a metal 256, e.g. monel metal, for protection against corrosion, if desired. Space II is normally filled with air under pressure, e.g. about 15 to 20 p.s.i.g. by means of a hose 230 which extends through flange 216 (not shown). The air pressure in space II bleeds through bleed valve 254 at a reduced rate from space II into space I, which, accordingly, serves as a plenum chamber for the air filled spring. Space I is used to house the various hose connections 202 and 204 for the gas charging system, the mixing valve 189, the ignition spark plugs 207 and 207', hose 230, etc.

In operation the gas exploder is located at a suitable location with support plates 14 and 15 resting upon the surface of the ground and cleats 16 penetrating the ground. Typically the force of spring 154 is such that operation of piston 152 does not occur until a pressure within exploder chamber A' on the order of 30 p.s.i.g. has been reached. Conduits 202 and 204 introduce gases such as propylene and oxygen until a pressure in exploder Chamber A' on the order of 2 p.s.i.g. has been achieved. A stoichiometric mixture of oxygen and propylene is preferred, and this is achieved quite simply by introducing the gases such that the partial pressures of each are in proportion to to molar ratio of a stoichiometric mixture, i.e., $4.5:1::O_2:C_3H_6$. Mixing valve 189 insures adequate mixing of the gases. The pressure in space II is adjusted by introducing air through conduit 230 to provide a pressure sufficient to hold the low mass member 112 and the high mass member 110 together and return them after an explosion. The mixture of oxygen and propylene is ignited by spark plugs 207 and 207'. Due to the larger mass of member 110, the initial force of the explosion acts against member 112 to create the seismic wave of interest. The continued expansion of the exploding gases moves member 112 relative to member 110, tending to compress the air spring formed by Space II. The pressure caused by the exploding gases forces sealing ring 113 tightly against the joint formed between the flange 122 and plate 124, generally deforming ring 113 against such joint. At the same time as relative movement of the members 112 and 110 occurs, piston 152 is moved at an even faster rate to vent chamber A' through valve 114 and muffler 115. This venting action is so rapid that normally the pressure within chamber A' is relieved within a fraction of a second, and generally after such venting, the pressure of unvented combustion gases remaining between members 110 and 112 is substantially negative to atmospheric, being on the order of 5 p.s.i.a. As a result, it is usually unnecessary in subsequent firing to purge the interior of the gas exploder when recharging, and recharging can be so fast that repetitive firing at significantly rapid rates is feasible. After an explosion, members 110 and 112 are biased toward their closed position by the air pressure within space II. The air pressure in space II also prevents separation of members 110 and during use of the exploder. Closure of valve 114 through the action of spring 154 is timed to provide for exhaust of chamber A'.

The movement of low mass member 112 caused by the explosion in chamber A' causes movement of cleated support plate 14 away from exploder unit 11. As can be seen in FIG. 1, cleats 16 are shaped to cause this movement of plate 14 to be transferred to the surrounding ground. As a result a shear wave is generated within the ground in the direction of movement.

Smooth support plate 15 does not generate a shear wave in the opposite direction because its smooth bottom surface prevents transfer of motion of plate 15 to the ground and because plate 15 has only a small horizontal motion due to the larger inertia of high mass member 124 to which plate 15 is rigidly coupled.

Figure 5:
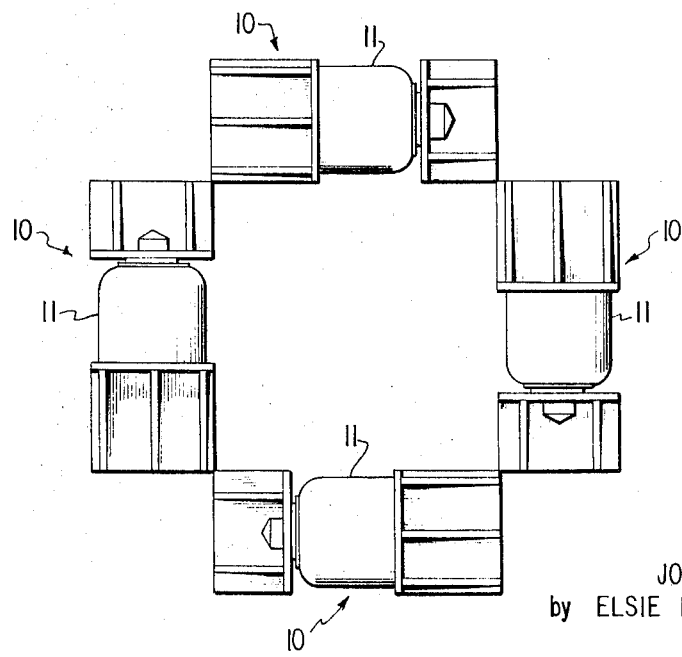
FIG. 5 is a plan view of an embodiment of the present invention suited for the generation of torsional shear waves.

The shear wave generated by generator 10 will be either a horizontal shear wave or a vertical shear wave, depending upon the orientation of generator 10 with respect to the incidence plane. To generate a torsional shear wave, four shear wave generators 10 are connected together as depicted in FIG. 5. A corner of the cleated support plate 14 of each generator 10 is rigidly connected by suitable means such as bolts or welding to a corner of the smooth support plate 15 of an adjacent generator 10. Thus, the four generators 10 are connected together to form a ring. Simultaneous explosion within each exploder 11 causes a torsional or rotary shear wave within the ground. The angular direction of this torsional shear wave is determined by the orientation of the four generators 10. While FIG. 5 depicts four generators 10, torsional shear waves could be generated by connecting together three or more generators 10.

Although the present invention has been described with reference to preferred embodiments, numerous modifications could be made, and still the resulting apparatus would be within the scope of the invention.

It is claimed:

1. Apparatus for propagating a seismic shear wave comprising means defining a closed chamber including first and second horizontally displaced members resiliently fastened together to permit horizontal movement therebetween; means for introducing combustible gas into said chamber; means for igniting combustible gas within said chamber; means for exhausting combustion products from said chamber; and means for transferring to the ground the horizontal movement of said first horizontally displaced member.

2. Apparatus for propagating a seismic shear wave comprising means defining a closed chamber and including a rigid low mass member and a rigid high mass member horizontally displaced from said low mass member and having at least a portion telescoping into said low mass member and forming a joint between said members having clearances therebetween; a resilient sealing ring disposed between said members on the inner side of said joint positioned against the clearances thereof to seal said chamber; resilient fastening means for attaching said low mass member to said high mass member while permitting horizontal movement between said members including spring means attached to said high mass member for limiting said movement, said spring means normally biasing said members together; gas charging means including conduit means providing external communication to said chamber adapted to provide a combustible mixture in said chamber; ignition means for the combustible mixture; exhaust means including means defining an opening in said high mass member adapted to provide external communication from the atmosphere to said chamber and normally closed valve means positioned in said opening to close said communication therethrough and operable upon a predetermined increase in pressure in said chamber to open thereby communicating said chamber with the exterior of said device; and ground coupling means connected to said low mass member for transferring the horizontal movement of said low mass member to the ground.

3. Apparatus as defined in claim 2 wherein said spring means includes at least one air spring cushion.

4. Apparatus as defined in claim 2 wherein said resilient fastening means comprises a first annular member secured to said low mass member outwardly of the high mass member and extending beyond the high mass member, and a second annular member secured to and extending from said high mass member, said first and second annular members being arranged to slidingly and sealingly engage each other to form therebetween an air cushion, said air cushion constituting said spring means, and means for supplying air under pressure to said air cushion.

5. Apparatus as defined in claim 4 wherein said exhaust means includes muffler means sealingly secured to said high mass member adjacent said opening and wherein said second annular member includes a flange engaging said muffler means to form therewith an air space, bleed valve means interconnecting said air cushion and the air space, said gas charging means and ignition means being arranged at least in part in said air space.

6. Apparatus as defined in claim 5 wherein said gas charging means includes a mixing valve arranged in said air space and in the conduit means providing external communication to said chamber and wherein said ignition means includes spark plug means operatively arranged in the conduit means downstream of said mixing valve for igniting the gas mixture in said conduit means and said chamber.

7. Apparatus as defined in claim 6 wherein said valve means is a spring biased piston valve.

8. Apparatus as defined in claim 2 wherein the gas charging means includes a first conduit formed by a groove in the outer surface of said high mass member and plate means secured to said high mass member adjacent said groove, at least one second conduit connecting said first conduit to said chamber, and means for supplying a mixture of fuel gas and oxygen-containing gas to said first conduit including a mixing valve attached to said plate means and means for interconnecting said mixing valve to a source of fuel gas and a source of oxygen containing gas, and wherein said ignition means includes spark plug means operatively arranged on both sides of the mixing valve to ignite the gas mixture in said first conduit.

9. Apparatus as claimed in claim 1 in which said transferring means includes a first support plate rigidly attached to said first horizontally displaced member and having downwardly disposed cleats for penetrating into the ground to transfer the horizontal movement to the ground and a second support plate rigidly attached to said second horizontally displaced member.

10. A seismic torsional wave generator comprising at least three apparatuses according to claim 9, each of said apparatuses having its first support plate attached to the second horizontally displaced member of a first adjacent one of said apparatuses and its second horizontally displaced member rigidly attached to the first support plate of a second adjacent one of said apparatus to connect the apparatuses in a ring.

11. A seismic torsional wave generator comprising at least three apparatuses according to claim 1, each of said apparatuses having its transferring means rigidly attached to the second horizontally displaced member of a first adjacent one of said apparatuses and its second horizontally displaced member rigidly attached to the transferring means of a second adjacent one of said apparatuses to connect the apparatuses in a ring.

12. A seismic torsional wave generator comprising at least three apparatuses according to claim 2, each of said apparatuses having its ground coupling means rigidly attached to the high mass member of a first adjacent one of said apparatuses and its high mass member rigidly attached to the ground coupling means of a second adjacent one of said apparatuses to connect the apparatuses in a ring.